United States Patent
Keskar (10) Patent No.: US 11,394,528 B2
(45) Date of Patent: Jul. 19, 2022

(54) SYSTEM AND METHOD FOR ON-DEMAND UNSUPERVISED DATA ANALYTICS ON BLOCKCHAIN

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 427 days.

(21) Appl. No.: 16/572,826

(22) Filed: Sep. 17, 2019

(65) Prior Publication Data

US 2020/0092083 A1    Mar. 19, 2020

Related U.S. Application Data

(60) Provisional application No. 62/732,097, filed on Sep. 17, 2018.

(51) Int. Cl.
*H04L 9/06* (2006.01)
*G06N 20/00* (2019.01)

(52) U.S. Cl.
CPC ........... *H04L 9/0637* (2013.01); *G06N 20/00* (2019.01); *H04L 2209/38* (2013.01)

(58) Field of Classification Search
CPC ............. G06F 11/3476; G06F 11/1474; G06F 16/2358; G06F 16/2445; G06F 16/20; G06F 16/245; G06F 16/248; G06Q 2220/00; H04L 63/0428
See application file for complete search history.

(56) References Cited

U.S. PATENT DOCUMENTS

2020/0175611 A1 *   6/2020   Gelfand ............... A61B 5/0022

* cited by examiner

*Primary Examiner* — Olugbenga O Idowu
(74) *Attorney, Agent, or Firm* — Ziegler IP Law Group, LLC (57) ABSTRACT

Disclosed herein is a system and method for performing on-demand data analytics directly on blockchain without the need to extract data from the blockchain to an external intermediary platform. The system and method disclosed herein enable unsupervised learning-based analysis directly on the blockchain, for data records stored on the blockchain. Furthermore, the system and methods disclosed herein allows a consumer to execute custom data analysis algorithms, in addition to standard data analytics, on data records to generate useful insights.

14 Claims, 4 Drawing Sheets

SYSTEM AND METHOD FOR ON-DEMAND UNSUPERVISED DATA ANALYTICS ON BLOCKCHAIN

CROSS REFERENCE TO RELATED APPLICATIONS

This application claims priority to U.S. Provisional Patent Application No. 62/732,097 filed Sep. 17, 2018, which is hereby incorporated by reference in its entirety.

TECHNICAL FIELD

The present application relates generally to the field of information processing and data analytics and particularly to customized data analytics solutions on blockchain based platforms. Moreover, the present invention relates to data analytics solutions using unsupervised learning methods on a blockchain based platform.

BACKGROUND

Data Analytics has recently gained significant attention in recent times for solving highly complex problems. Data Analytics primarily includes determination of large-scale data correlations. It includes processing huge amount information for generating useful insights for any business process. Data Analytics allows processing of millions of data records, which is not possible by humane efforts. Moreover, it reduces human biases in delivered insights. Recently, machine learning algorithms such as unsupervised learning have been used for data analytics wherein such algorithms can automatically analyse huge chunks of data based on learning design and hence have moved away from the conventional rule-based algorithms. The benefits of data analytics can be gained once we have a comprehensive repository of data records from which one intends to gather insights from. Conventionally, data records are stored and maintained in traditional databases and the abovementioned data analytics solutions including unsupervised learning are processed by fetching data records from the said traditional databases. These traditional databases and the subsequent data analytics solutions are customarily executed by an intermediary solution provider. Owing to problems associated with such intermediary based data processing and analytics solutions such as confidentiality, security and cost, industry has been gradually shifting to blockchain architecture for information processing and management. More and more businesses are using blockchain to decentralize their applications (to make it intermediary free) and as a result more transaction data is being added to the blockchain. While block chain provides extreme levels of security by removing intermediary in data processing, users face problems in data analytics since there is no method, as of now, to directly process and analyse the data present on blockchain. Hence, in return for enhanced security, blockchain restrict the usage of data analytics and therefore, generation of insights from data.

One of the commonly used methods for data analytics on blockchain is fetching all data records stored in one or more blocks of the blockchain, storing the fetched data records on external intermediary platform and processing the same on a separate database, external to the blockchain platform, for the purpose of generating insights.

The abovementioned method of data analysis of data records stored on a blockchain results in large amount of data exchange with the intermediary platform which is time consuming and inefficient. Further, such method of data extraction from the blocks of the blockchain platform for data analysis is against the spirit of blockchain which strives to make information processing and management intermediary free. In the solution mentioned above, the external intermediary platform used for data analysis eliminates all advantages associated with a blockchain.

In light of the above-mentioned shortcomings associated with existing data analysis method and systems for analysis of data records stored on blockchain platform, it is highly desirable to have a system and method that allows data analytics directly on the blockchain. The present invention, as described below, allows a user to perform data analytics directly on the blockchain without the need for extracting data records from the blockchain and storing the said data records on an external intermediary platform for further processing.

SUMMARY

Embodiments of the present disclosure present technological improvements as solutions to one or more of the above-mentioned technical problems recognized by the inventor in conventional systems.

In an aspect of the present invention, a system and method for enabling, on a blockchain, on-demand data analytics of data records stored on the blockchain is provided.

In another aspect, a system and method for enabling, on a blockchain, unsupervised learning-based data analytics of data records stored on the blockchain is provided.

In yet another aspect of the present invention, a system and method for enabling, on a blockchain, customized data analytics on data records stored on the blockchain is provided.

In another aspect, a system and method for retrieving data analytics insights, directly from a blockchain, for data records stored on the blockchain without extracting data records to an external intermediary platform, is provided.

In yet another aspect, a system and method for enabling, on a blockchain, data analytics using data records stored on an off-chain repository controlled by the blockchain is provided.

Beneficially, the present invention provides a system for performing data analytics on a blockchain communicably coupled to a server arrangement via one or more data communication network wherein the blockchain is configured to:
  receive an analysis transaction wherein the analysis transaction is operable to implement at least data processing algorithm on a set of data records;
  execute the analysis transaction wherein the execution of the analysis transaction comprises:
    retrieving the set of data records from a data structure repository within an initial smart contract of the blockchain;
    invoking at least one smart contract method wherein the smart contract method, when executed, implements the data processing algorithm on the set of data records;
  return an output generated from implementation of the data processing algorithm on the set of data records.

In yet another aspect, the present invention provides a method for performing data analytics on a blockchain communicably coupled to a server arrangement via one or more data communication network, the method comprising:

receiving, on the blockchain, an analysis transaction wherein the analysis transaction is operable to implement at least data processing algorithm on a set of data records;

executing, the analysis transaction wherein the execution of the analysis transaction comprises:

retrieving the set of data records from a data structure repository within an initial smart contract of the blockchain;

invoking at least one smart contract method wherein the smart contract method, when executed, implements the data processing algorithm on the set of data records;

returning an output generated from implementation of the data processing algorithm on the set of data records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the below-mentioned detailed description and drawings.

OBJECT OF INVENTION

An object of the invention is to enable data analytics directly on the blockchain, without the need of fetching data records outside the blockchain.

Another object of the invention is to enable unsupervised learning algorithms implementation on blockchain without the need of fetching data records outside the blockchain.

Another object of the invention is to enable custom algorithms implementation on data records stored on a blockchain without the need of fetching data records outside the blockchain.

BRIEF DESCRIPTION OF DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the nonunderlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data. Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Additional modules can be included without deviating from the novel art of this disclosure. In addition, each module can include any number and combination of sub-modules, and systems, implemented with any combination of hardware and/or software modules.

Method steps of the invention may be performed by one or more computer processors executing a program tangibly embodied on a computer-readable medium to perform functions of the invention by operating on input and generating output. Suitable processors include, by way of example, both general and special purpose microprocessors. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer executable instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer executable instructions for carrying out a plurality of operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The present invention claims a system and method for enabling, on a blockchain, on-demand data analysis of data records stored on the blockchain and fetching the insights from the blockchain. Throughout this disclosure, the term "insights" refers to information obtained from processing of data records resulting in identification of data trends, patterns and behaviour. Similarly, the term "data analytics" refers to various data processing algorithms executed on data records and includes both rule-based algorithms and unsupervised learning-based analysis algorithms. It shall be appreciated that data analytics inherently results in generation of insights and hence data analytics is a precursor to insights generation from data records. Furthermore, the term "data records" refers to information stored in the blocks of the blockchain platform and includes financial data, sales data, medical data, etc. Throughout the present disclosure, the term "consumer" relates to any organization and/or individual that desires to use the insights and data analytics generated on the blockchain.

Beneficially, the data records are converted to a predefined format before addition of the data records to the blockchain. In an embodiment of the present invention, the data records are stored in json format.

Figure 1:
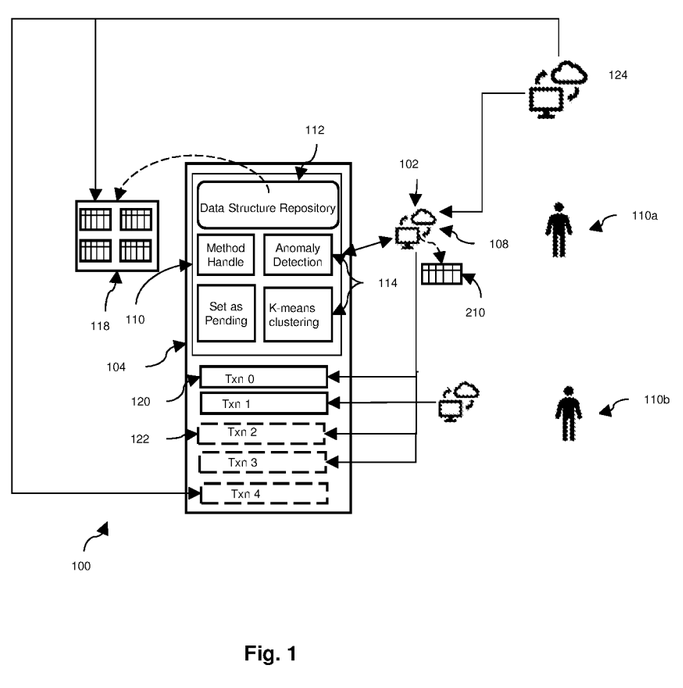
FIG. 1 is a schematic illustration of the system for performing on-demand data analysis on the blockchain according to an exemplary embodiment of the present disclosure.
Figure 2:
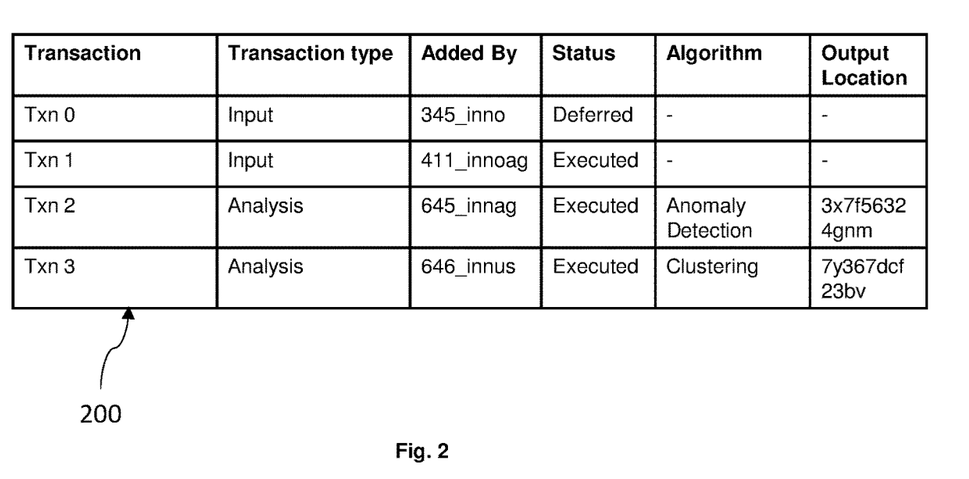
FIG. 2 depicts a status index as per the present disclosure.

FIG. 1 depicts an exemplary embodiment wherein the system 100 comprises a server arrangement 102 coupled to a blockchain 104 and one or more consumers 110a, 110b. ... Each consumer is enabled to interact with the system 100 via a user interface 106 associated with a client device 108. The blockchain 104 can be a public blockchain or a private blockchain. Optionally, the blockchain could be permissionless or permissioned. The blockchain 104 is configured to include an initial smart contract 110 wherein the initial smart contract comprises at least one data structure repository 112. The initial smart contract 110 further comprises one or more data processing methods 114 with pre-configured permissions. Each of the data processing methods 114 is a smart contract method that, when invoked, implements at least one data processing algorithm on one or more data records within the data structure repository 112 of the initial smart contract 110. The blockchain 104 is further operable to maintain a list of available data processing methods and their corresponding arguments through Application Binary Interface (ABI). Further, the initial smart contract 110 comprises a status index 118 of one or more transactions added to the blockchain 104 wherein each of the one or more transactions of the status index are mapped against a type of transaction, data processing method, added by consumer id, an execution status and an output. FIG. 2 depicts a status index 118 as per the exemplary embodiment.

Throughout this disclosure, the term "initial smart contract" refers to a preconfigured smart contract appended to a blockchain and includes a set of object definitions that are created automatically at the time of deployment of the preconfigured smart contract. The initial smart contract is an essential element for the blockchain communicably coupled to the data requester and the data provider. Any blockchain as per the disclosed system must be deployed said initial smart contract. The term "smart contract method" refers to set of codes which are used to interrogate a smart contract or change its state. A smart contract can have more than one smart contract methods within it, based on the desired output. The term "data structure repository" refers to an organized collection of data elements stored inside the smart contract on a blockchain. These data elements can have different types and different lengths. The said data structure repositories can be either linear data structures or hierarchical. As a non-limiting example of such data structure repository, as used in one of the embodiments of the present disclosure, are linked lists and arrays with data elements being stored in the data structure repository in key-value pair format. Furthermore, the term "off-chain data storage medium" refers to any storage of data records which isn't stored on a blockchain. An example of such off-chain storage medium is Enigma, Swarm etc. The blockchain, in such cases, reads the data from third party solutions such as Oracle.

The server arrangement 102 is operable to enable a consumer to add one or more input transactions to the blockchain 104 wherein the one or more input transaction comprises at least one data record stored in a predefined format. The one or more input transactions are added by the consumer through a web-based application or mobile based application communicably coupled to the server arrangement. In an alternate embodiment, third party extensions on the server arrangement 102 allowing addition of the one or more input transactions to the blockchain 104 are used. Optionally, the at least one data record may be stored in an off-chain storage medium, external to the blockchain, controlled by the blockchain. The at least one data record stored in the off-chain storage medium is converted to a format accepted by the blockchain and can be efficiently fetched by the blockchain on the fly.

The term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as a memory unit, a processor, a network adapter, and the like, to store and process information pertaining to the document and to communicate the processed information to other computing components, for example, such as a client device. Furthermore, the server arrangement comprises a database arrangement for storing data therein.

The term "user interface" refers to a graphical user interface unit or a command line interface which enables a user to access information stored on the blockchain and/or to store information on the blockchain. Further, the user interface is configured to receive one or more inputs from a user.

In the exemplary embodiment described in FIG. 1, a plurality of consumers 110a, 110b . . . are enabled to add one or more input transactions to the blockchain 104. Each of the one or more input transactions added to the blockchain 104 is entrusted with pre-configured permissions to add an attribute to the data records stored in the data structure repository 112 of the initial smart contract 110. One or more data attributes of the data record are stored along with the data record in the data structure repository 112. Preferably, the attributes of the data record added to the data structure repository of the smart contract are in a key-value pair json format. As a non-limiting example of the said key-value pair json format, the plurality of attributes are as following:
Author—Ravindra Chauhan;
Therapeutic Area—Oncology;

In an embodiment, the initial smart contract 110 comprises a plurality of the data structure repositories wherein each of the plurality of the data structure repositories is configured to store one class of data records. The class of data records, as mentioned herein, can be, including but not limited to, medical records, patient data, finance data etc. It shall be appreciated that the classes can be further subdivided into multiple sub-classes with each sub-class being stored in a distinct data structure repository. The data record and the data structure repository are assigned a class identifier wherein the class identifier denotes the class of data record. As per the preferred embodiment of the present invention, each of the one or more transaction is entrusted with pre-configured permissions to store a data record with a class identifier in the data structure repository assigned with the same class identifier. In yet another embodiment, the data structure repository of the initial smart contract is configured to store a plurality of classes of data records and corresponding plurality of data structure repositories with each of the plurality of data structure repository storing a class of data records.

The system 100 enables data analytics on the at least one data record by means of an analysis transaction 120 to be added to the blockchain, on the fly, by the user wherein the analysis transaction 120 is operable to invoke at least one data processing method within the initial smart contract 110. The analysis transaction 120 has preconfigured permission to access the initial smart contract 110 and fetch data records from the data structure repository 112 of the initial smart contract 110. Further, the analysis transaction 120 comprises of one or more parameters required for the data processing method being invoked, on the initial smart contract 110, by the analysis transaction 120.

Figure 3:
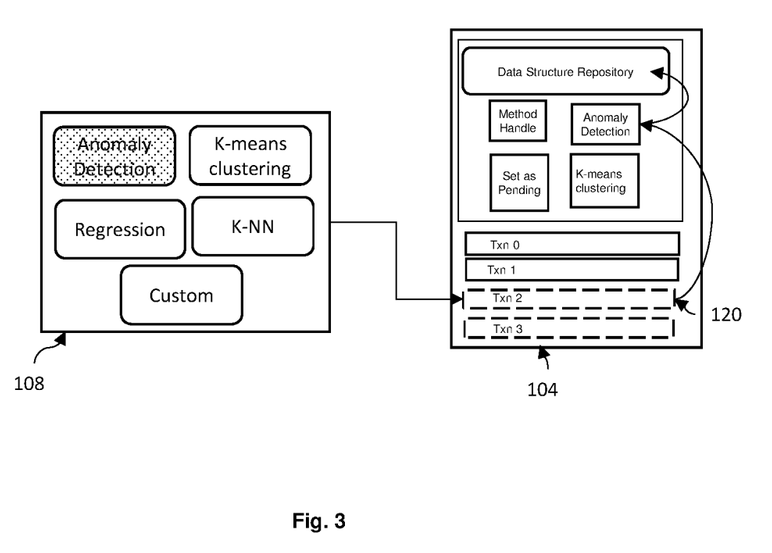
FIG. 3 depicts the system with the user interface for adding one or more analysis transaction for performing data analytics.

FIG. 3 depicts a preferred embodiment of the present invention, wherein a consumer intends to implement unsupervised learning algorithms on the set of data records stored in the data structure repository 112 in the initial smart contract 110. The system 100 provides a plurality of standard analysis transactions with pre-configured permissions to invoke at least one pre-defined algorithm such as anomaly detection, segmentation, clustering etc for data analytics. A consumer, via the user interface 108, can select one or more standard analysis transaction for performing data analytics on the set of data records. Further, the analysis transaction 120 has pre-configured permissions to fetch the set of data records from the data structure repository 112 of the initial smart contract 110. The analysis transaction 120 is executed, the corresponding data processing algorithm is implemented, and the generated insights and output of the data processing algorithm are returned by the analysis transaction.

Optionally, in case of undesirable results, the analysis transaction 120 is paused and the configuration parameters for the one or more algorithms are altered. The analysis transaction 120 is then again executed, after alteration of configuration parameters of the desired algorithm, in order to achieve the correct data analytics insights. In an aspect of the present invention, the system enables pre-processing of the set of data records prior to implementation of the data processing algorithm.

The output of data processing method 114 implemented on the set of data records within the data structure repository 112 of the initial smart contract 110 is written to the analysis transaction 120 and is finally transmitted to the consumer in form of the consumer fetching the output from the analysis transaction. Optionally, the output is written into a memory location of the data structure repository 112 of the initial smart contract 110 of the blockchain 102 and an address pertaining to the said memory location within the data structure repository 112 is updated against the entry corresponding to the analysis transaction 120 in the status index 118. The said memory location is written to the analysis transaction, which is fetched by the consumer. The output may be fetched, subsequently, by adding a transaction with preconfigured permissions to access the memory location in the data structure repository 112, the said memory location being passed along with the transaction. Alternatively, the output may be fetched using the API exposed by the blockchain 104.

Figure 4:
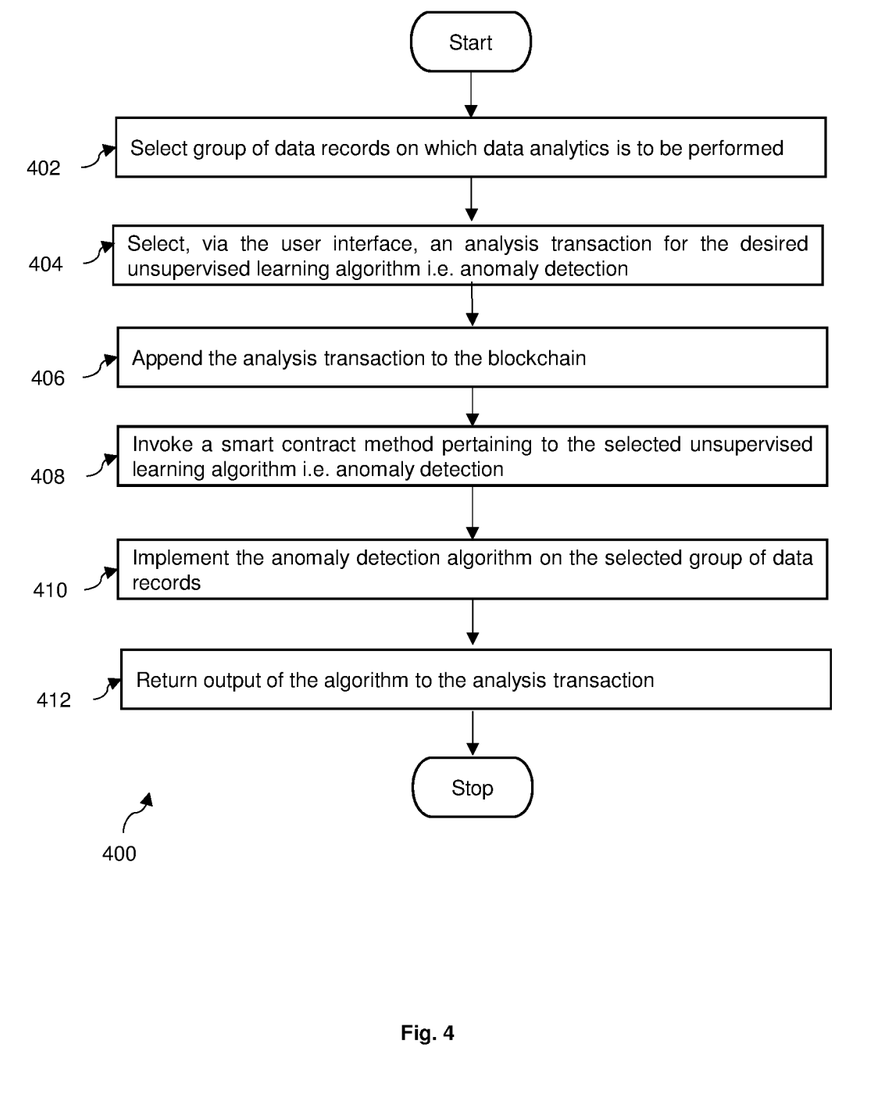
FIG. 4 depicts a flowchart describing the method steps in implementing data analytics directly on the blockchain as per the present disclosure.

In an example embodiment of the present invention as per the method steps depicted in FIG. 4, at step 402 the consumer selects, via the user interface, a group of data records on which data analytics needs to be done. Further, at step 404, the consumer selects an analysis transaction operable to implement anomaly detection algorithm on the stored data records. At step 406, said action results, in an analysis transaction being appended to the blockchain 104 wherein the analysis transaction has preconfigured permissions to invoke, at step 408, a smart contract method, that when executed implements, at step 410, an anomaly detection algorithm, within the initial smart contract 110 of the blockchain 104. At step 412, the output is returned to the analysis transaction or stored in a memory location to be later retrieved.

Similarly, in another example embodiment, a consumer may intend to perform clustering operation on the stored data records on the data structure repository 112 of the initial smart contract 110 of the blockchain 104. In an embodiment, an analysis transaction is added, via the user interface, to the blockchain 104 by the consumer intending to perform clustering operations wherein the analysis transaction has preconfigured permissions to invoke a smart contract method, that when executed implements k-means clustering algorithm, within the initial smart contract 110 of the blockchain 104. The analysis transaction, when executed, access the data structure repository of the smart contract, fetches the data records and invokes the smart contract method pertaining to k-means clustering algorithm and subsequently executes the k-means clustering algorithm on the fetched data records. The data records stored in the data structure repository 112 of the initial smart contract 110 is grouped into best-fit clusters as an output of the k-means clustering and the output is returned to the analysis transaction. Alternatively, any of the methods for retrieving output as described in the foregoing paragraphs can be used.

In another embodiment, the consumer can select, via the user interface, a particular class of data records, based on the class identifier, on which data analytics has to be performed. The analysis transaction is configured to store class identifier of the said data records within the data structure repository 112. Consequently, the analysis transaction, when executed, fetches the data records from the data structure repository 112, with the same class identifier and executes the smart contract method, invoked by the analysis transaction, on the fetched data records.

In yet another embodiment, the data records are stored on an off-chain storage medium which are controlled by the blockchain 104. The said data records are stored in a pre-defined format readable by the blockchain. At the time of execution of the analysis transaction, the data records are accessed, by the blockchain, via demux feature through which the off-chain storage medium is accessed and controlled by the blockchain 104. The analysis transaction invokes the smart contract method that implements the algorithm stored on the data records fetched, on the fly, from the off-chain storage medium.

In an alternate embodiment, one or more algorithms, along with their respective code script and required configuration parameters, used for data analytics on the stored data records on the data structure repository 112 of the initial smart contract 110 of the blockchain 104 is passed along-with the analysis transaction. This enables addition of new algorithms, on the fly, since the pre-configured smart contract methods might contain older version of algorithms. Further, the initial smart contract may not have access to new algorithms and passing scripts for algorithm along-with the analysis transaction results in implementation of latest algorithm on the data records, as per need of the consumer. As per the alternate embodiment, the analysis transaction can be customized by the user to include custom algorithms for data analytics. Further, the user can add one or more analysis transactions, Analysis Txn 1, Analysis Txn 2 and so on. Further, in another aspect, the blockchain comprises a native processing block that enables processing of algorithms in different programming languages.

In another embodiment of the present invention, the initial smart contract 110 comprises a look-up table 116 with each row corresponding to at least one data processing algorithm present on the blockchain. Each row of the look-up table 116 further comprises information pertaining to last processed transaction id by a given data processing algorithm. The blockchain is configured to identify a data processing algorithm associated with the analysis transaction and a set of data records with a class identifier. The blockchain further determines if the said data processing algorithm is previously run on the same set of data records with the same class identifier. Examples of such processes could be repetitive processing such as anomaly detection in set of financial data records run every week or month. Responsive to determination of prior processing of a set of data records by a data processing algorithm, the blockchain is configured to retrieve information pertaining to last processed transaction id and compare to the transaction id of last data record added by an input transaction. Based on said comparison, the blockchain determines if there are new data records that have been added since last implementation of the data processing algorithm. In the event of new data records added to the blockchain, the data processing algorithm is implemented on the entire set of data records including the previous data records. The output is stored against the entry, in the status index 118, corresponding to the previous analysis transaction that implemented the said data processing algorithm. The analysis transaction 120 reads the output from the status index 118.

In an aspect of the present invention, a consumer is enabled to select, via the user interface, a set of data records and a data processing algorithm to be implemented in order to perform data analytics on the said set of data records. The set of data records can be selected by means of a class identifier. The data processing algorithm can be selected out of a list of standard data processing algorithms available on the blockchain. Optionally, the consumer can add a custom data processing algorithm by adding a script code and required configuration parameters, if any, to an analysis transaction. Further, the consumer can select repetitive processing option for the data processing algorithm, if said data processing algorithm needs to be implemented multiple times based on a time-schedule or threshold data records trigger. The analysis transaction is then appended to the blockchain 104. An entry corresponding to the analysis transaction is added to the status index 118 wherein the entry comprises a transaction id, consumer name, a type of transaction, and repetitive processing details, if any. The analysis transaction has preconfigured permissions to fetch the set of data records from the data structure repository of the initial smart contract of the blockchain 104. The data processing algorithm is implemented on the set of data records and an output is returned to the analysis transaction. Further, the output is stored against the entry corresponding to the analysis transaction in the status index 118.

In case of repetitive processing, as per the above described embodiment, the analysis transaction is paused until the threshold number of new data records are added to the data structure repository. Optionally, alternatively, the repetitive processing can be time-based. Subsequent to threshold number of new data records, the analysis transaction is resumed for execution and a new output is updated against the entry corresponding to the analysis transaction in the status index 118. The system 100 further comprises a continuous listener module 124 wherein the continuous listener module 124 keeps querying the status index 118 to identify changes in an entry of the status index pertaining to an analysis transaction. As an example of such case could be change in output from an analysis transaction. The continuous listener module 124 subsequently reads the new output from the status index 118 and notifies a third party or a consumer of the same.

Optionally, in certain cases, the continuous listener module 124 is operable to identify addition of data records with the same class identifier. Based on the identification of addition of new data records, the continuous listener module 124 is further operable to append an analysis transaction to the blockchain wherein the analysis transaction implements the data processing algorithm associated with the given set of data records, as per the look-up table.

As a non-limiting example of the described embodiment, a consumer adds an analysis transaction corresponding to anomaly detection algorithm to be implemented on a set of data records pertaining to financial transactions processed on a blockchain, to identify fraudulent, suspicious dealings. The consumer is provided with an option, via the user interface, to opt for repetitive processing on a regular basis. In case, the data processing algorithm is a custom data processing algorithm not previously available on the blockchain, a copy of said custom data processing algorithm is saved on the initial smart contract. The analysis transaction is executed to identify anomalous transactions and the output is stored against the entry corresponding to the analysis transaction in the status index 118. Subsequently, the analysis transaction is paused and in case of repetitive processing on a regular basis, the initial smart contract identifies whether new set of data records with the same class identifier have been added. The analysis transaction is resumed for execution once a trigger threshold of new data records added is achieved. A new output is generated and stored in the status index 118 against the entry corresponding to the analysis transaction wherein the new output corresponds to newly identified anomalous transactions.

Alternatively, the continuous listener module 124 identifies addition of new data records with the same class identifier i.e. financial/bank transactions in the example case. The continuous listener module 124 identifier further identifies the data processing algorithm implemented on given set of data records through the look-up table. In the present case, said data processing algorithm is anomaly detection. Further, a number of counts of new data records can be set as a trigger threshold for re-implementation of the data processing algorithm i.e. anomaly detection is the present case. Subsequent to crossing the trigger threshold, the continuous listener module 124 adds an analysis transaction that implements anomaly detection algorithm on the entire set of data records including newly added data records, in order to identify new anomalous transactions.

Responsive to identification of new anomalous transaction, the continuous listener module 124 notifies the consumer which had placed request for data analytics on the said set of data records. The above-mentioned process can be repeated multiple times in an automatic manner. Therefore, the disclosed system enables anomaly detection in financial transactions on a blockchain by directly implementing anomaly detection algorithm and without retrieving data records outside the blockchain.

Throughout the present disclosure, a consumer name is an alias used to refer a consumer. The alias could be any set of characters, numerical, alphanumeric codes, Hex codes or any nomenclature system capable of referring to and identifying a distinct entity.

It shall be appreciated by person skilled in the art that the terms "input transaction" and "analysis transaction" are used for naming purposes for better clarity and understanding of the disclosed invention and refer to a transaction added for adding data records and for implementing a data processing algorithm, respectively. In substance, the input transaction and analysis transaction are ascribed the same meaning as is prevalent in the industry in context of a transaction added to the blockchain.

Any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. At least portions of the functionalities or processes described herein can be implemented in suitable computer-executable instructions.

It will be appreciated that features of the present disclosure are susceptible to being combined in various combinations and additional features may be introduced without departing from the scope of the present disclosure.

I claim:

1. A system for performing data analytics on a blockchain communicably coupled to a server arrangement via one or more data communication network wherein the blockchain is configured to:

receive an analysis transaction wherein the analysis transaction is operable to implement at least data processing algorithm on a set of data records, wherein the analysis transaction comprises of a custom data processing algorithm, not previously present on an initial smart contract of the blockchain, and wherein a code script and one or more configuration parameters for the custom data processing algorithm are passed along-with the analysis transaction appended to the blockchain;

execute the analysis transaction wherein the execution of the analysis transaction comprises:

retrieving the set of data records from a data structure repository within the initial smart contract of the blockchain;

invoking at least one smart contract method wherein the smart contract method, when executed, implements the data processing algorithm on the set of data records;

return an output generated from implementation of the data processing algorithm on the set of data records.

2. The system of claim 1 wherein the initial smart contract comprises a plurality of smart contract methods for implementing one or more data processing algorithms on the set of data records in the data structure repository within the initial smart contract.

3. The system of claim 1, wherein the analysis transaction is selected, by the consumer via the user interface, out of a set of available standard analysis transactions and wherein each of the standard analysis transaction corresponds to at least one data processing algorithm.

4. The system of claim 1, wherein the set of data records are added by means of input transactions appended to the blockchain by one or more consumers.

5. The system of claim 1, wherein the set of data records are stored in a data structure repository of within the initial smart contract of the blockchain.

6. The system of claim 5, wherein the set of data records are stored along-with a class identifier.

7. The system of claim 1, wherein the analysis transaction is configured to implement the data processing algorithm on a set of data records with same class identifiers.

8. A method for performing data analytics on a blockchain communicably coupled to a server arrangement via one or more data communication network, the method comprising:
receiving, on the blockchain, an analysis transaction wherein the analysis transaction is operable to implement at least data processing algorithm on a set of data records, wherein the analysis transaction comprises of a custom data processing algorithm, not previously present on an initial smart contract of the blockchain, and wherein a code script and one or more configuration parameters for the custom data processing algorithm are passed along-with the analysis transaction appended to the blockchain;
executing, the analysis transaction wherein the execution of the analysis transaction comprises:
retrieving the set of data records from a data structure repository within the initial smart contract of the blockchain;
invoking at least one smart contract method wherein the smart contract method, when executed, implements the data processing algorithm on the set of data records;
returning an output generated from implementation of the data processing algorithm on the set of data records.

9. The method of claim 8 wherein the initial smart contract comprises a plurality of smart contract methods for implementing one or more data processing algorithms on the set of data records in the data structure repository within the initial smart contract.

10. The method of claim 8, wherein the analysis transaction is selected, by the consumer via the user interface, out of a set of available standard analysis transactions and wherein each of the standard analysis transaction corresponds to at least one data processing algorithm.

11. The method of claim 8, wherein the set of data records are added by means of input transactions appended to the blockchain by one or more consumers.

12. The method of claim 8, wherein the set of data records are stored in a data structure repository of within the initial smart contract of the blockchain.

13. The method of claim 12, wherein the set of data records are stored along-with a class identifier.

14. The method of claim 8, wherein the analysis transaction is configured to implement the data processing algorithm on a set of data records with same class identifiers.

* * * * *